United States Patent [19]

Ziegler et al.

[11] Patent Number: 4,840,656
[45] Date of Patent: Jun. 20, 1989

[54] METHODS AND APPARATUS FOR FORMING GLASS ARTICLES

[75] Inventors: Michael J. Ziegler, Parma; Barry Millward, Chagrin Falls; Kenneth P. Robb, Jr., Stow, all of Ohio

[73] Assignee: AGA A.B., Lidingö, Sweden

[21] Appl. No.: 259,465

[22] Filed: Oct. 17, 1988

Related U.S. Application Data

[63] Continuation of Ser. No. 70,403, Jul. 7, 1987, abandoned, which is a continuation-in-part of Ser. No. 945,285, Dec. 22, 1986, abandoned, which is a continuation-in-part of Ser. No. 798,614, Nov. 15, 1985, Pat. No. 4,652,292, which is a continuation-in-part of Ser. No. 600,410, Apr. 16, 1984, Pat. No. 4,553,999.

[51] Int. Cl.$^4$ ............................................... C03B 9/36
[52] U.S. Cl. ............................................ 65/85; 65/84; 65/137; 65/265; 65/267; 65/306; 65/355
[58] Field of Search ................... 65/32, 74, 81, 82, 83, 65/84, 85, 137, 261, 265, 267, 306, 355

[56] References Cited

U.S. PATENT DOCUMENTS

| 3,171,731 | 3/1965 | Barger | 65/162 |
| 3,235,353 | 6/1966 | Rupli | 65/262 |
| 3,236,620 | 2/1966 | Wiley | 65/84 |
| 4,553,999 | 11/1985 | Ziegler et al. | 65/85 X |
| 4,652,292 | 3/1987 | Ziegler et al. | 65/84 |
| 4,708,730 | 11/1987 | Ziegler et al. | 65/85 X |

FOREIGN PATENT DOCUMENTS

2041504 1/1971 France.

Primary Examiner—Arthur Kellogg
Attorney, Agent, or Firm—Calfee, Halter & Griswold

[57] ABSTRACT

A system for forming hollow pressed glass articles utilizes a flow of cryogen that is mixed with air to provide a cooling gas that enables newly pressed articles to be removed from their molds after a thin skin of solidified glass has been formed on internal surfaces of the articles to strengthen the newly formed articles and to give them shape stability. Two flows of cryogen are used, one being a gentle, substantially continuous flow of cryogen gas from a low pressure source, the other being a controlled intermittent flow of cryogen vapor in liquid and/or gaseous form from a high pressure source. To assure a proper introduction of cryogen vapor, and to prevent debilitating accumulations of ice within and about the tube that is used to inject high pressure cryogen, the high pressure injector tube is surrounded by a low pressure cryogen flow tube, through which a flow of low pressure cryogen gas is maintained on a substantially continuous basis. By this arrangement, when the high pressure flow of cryogen is shut off between bursts of flow into mold cavities that are brought sequentially into a cooling gas injection station, the discharge end of the high pressure injector tube is kept purged of moisture laden ambient air. Because the system of the present invention hastens cooling and solidification of newly formed glass articles, the time during which the articles must be retained in their molds is significantly reduced.

15 Claims, 1 Drawing Sheet

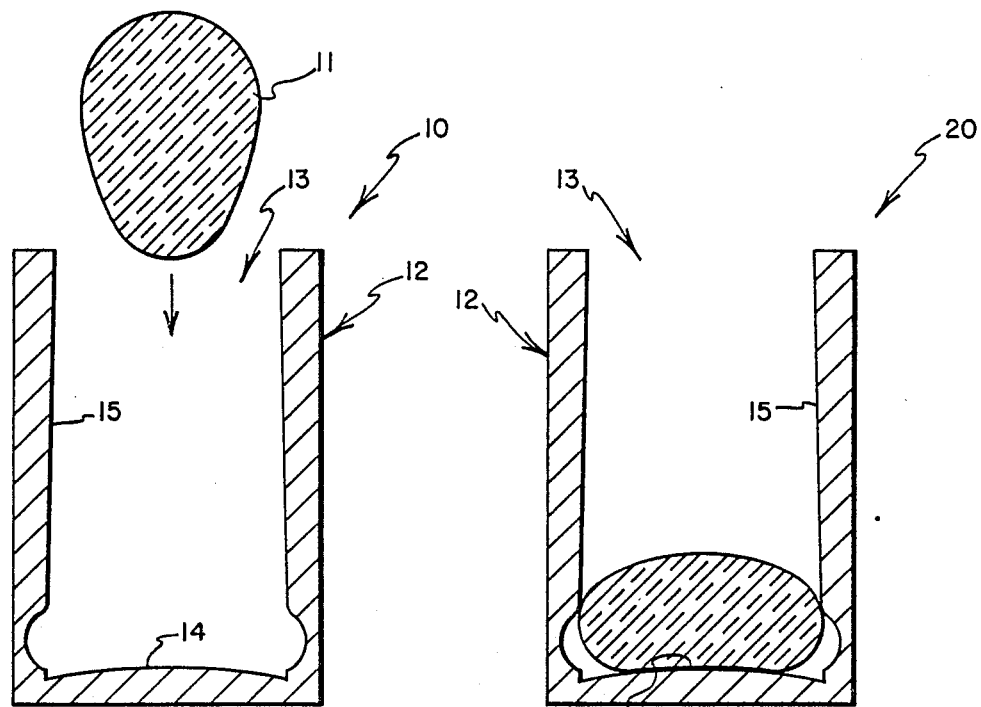
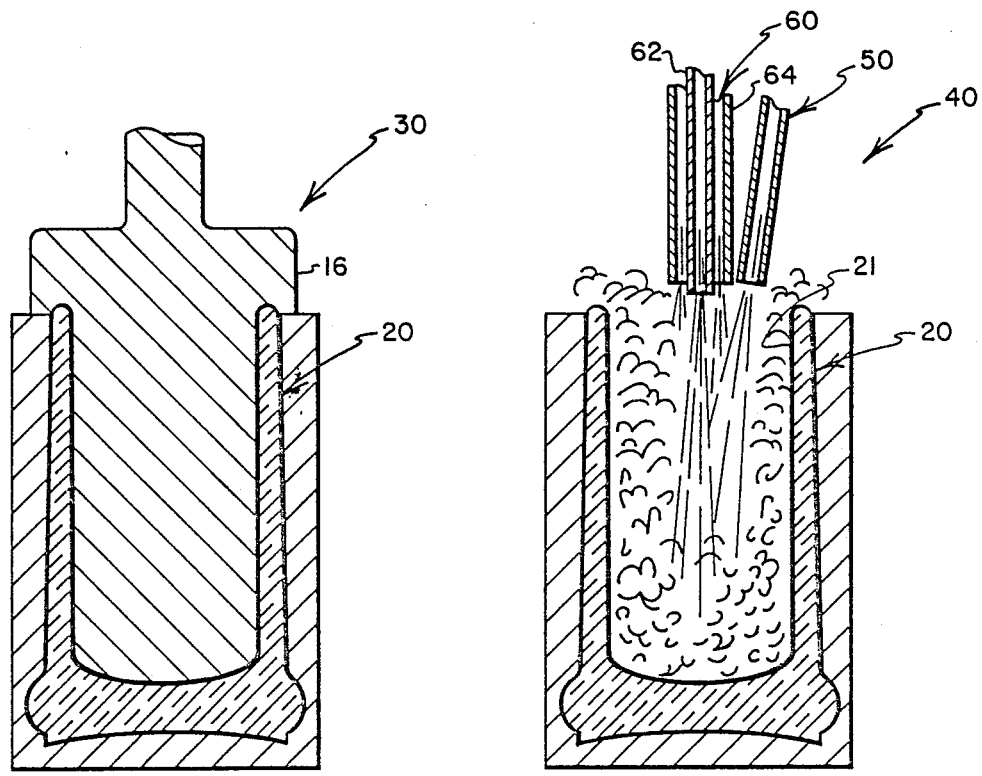

METHODS AND APPARATUS FOR FORMING GLASS ARTICLES

CROSS REFERENCE TO RELATED PATENTS AND APPLICATIONS

This application is a continuation of application Ser. No. 707,403, filed July 7, 1987, now abandoned, which is continuation-in-part of co-pending application Ser. No. 945,285, filed Dec. 22, 1986 now abandoned by Michael J. Ziegler et al as a continuation-in-part of application Ser. No. 798,614, filed Nov. 15, 1985 by Michael J. Ziegler et al (and issued Mar. 24, 1987 as U. S. Pat. No. 4,652,292) as a continuation-in-part of application Ser. No. 600,410, filed Apr. 16, 1984 by Michael J. Ziegler et al (and issued Nov. 19, 1985 as U. S. Pat. No. 4,553,999). The foregoing patents and applications are referred to hereinafter as the "Parent Cases," the disclosures of which are incorporated herein by reference.

BACKGROUND OF THE INVENTION

1. Field of the Invention

The present invention relates generally to the manufacture of glass articles that are formed by press molding, and, more particularly, to methods and apparatus for providing increased productivity in a glass manufacturing process by utilizing cryogen that preferably is introduced through tube-in-a-tube type injectors, with a flow of cryogen from a high pressure source being fed through the inner of the injector tubes, and with cryogen from a low pressure source being continuously fed through the outer of the injector tubes to provide cooling and to keep the high pressure injector tubes purged of ambient air to prevent moisture condensation on and ice formation in and about the high pressure injector tubes.

2. Prior Art

In the molding of hollow glass articles such as beer mugs and the like using the "press-molding method," a gob of glass typically is inserted into a mold where it is pressed to form an article of desired form. Ambient air is used, not only to cool the newly formed glass article, but also to cool the press mechanism.

In the press molding of glass, it is customary to utilize flows of air as a cooling gas. Usually a gentle flow of air is established across the mold area, which is referred to by the term "low pressure air flow." Also, provision is made to direct a more intense, blast like flow of air toward and into the hollow interiors of newly molded articles while the articles are still contained within their mold cavities to speed cooling and solidification of the articles so that the articles can be removed as quickly as possible from their molds. The relatively high velocity flow of air that is employed intermittently (i.e., at times when a newly molded article is moved from the pressing station and is positioned in a cooling station so that the article is aligned with an injector tube through which a high velocity flow of air discharges) is referred to by the term "high pressure air flow."

In order to speed the cooling of molded glass articles to diminish their mold retention times, proposals have been made to indirectly cool the articles by providing at least portions of their molds with cooling passages through which a fluid coolant is circulated. However, the degree to which mold cooling can be used to indirectly cool molded glass articles is limited not only by the tendency of this approach to induce defects (the number of defects induced in molded glass articles increases as mold temperatures are diminished), but also by the cost of forming cooling passages in the molds, and by the cost of providing suitable apparatus for maintaining controlled flows of coolant through the cooling passages.

While mold cooling provides some assistance in diminishing mold retention times, the retention times during which newly molded glass articles must be held in their molds to effect proper solidification continue to form "bottlenecks" that obstruct efforts to increase the productivity of existing molding equipment.

3. The Referenced Parent Cases

As is explained in the referenced Parent Cases, the use of flows of cold cryogen vapor that are introduced into mold cavities is applicable to a variety of glass molding techniques including press molding and blow molding. A flow of cold cryogen can be introduced into a mold cavity to cool a newly molded article and to cool such apparatus as has been used in the forming of the article. Thus molds can be recycled and reused more quickly than has previously been thought to be possible, and a very significant increase in productivity of molded articles is achieved while utilizing existing production facilities.

While uneven cooling of a molded glass article may create stress points, it does not cause significant warpage. Such stress points as are created in the forming of molded glass articles typically are dealt with by passing the articles through a lehr, a long furnace which tempers the glass by reheating it to about 900 degrees Fahrenheit, whereafter the glass is gradually cooled to allow the stress points to relieve themselves. Since the molded glass articles are put through a lehr, the only cooling that is necessary in conjunction with the actual molding of glass is a sufficient amount of cooling to assure that newly molded articles will retain their shape once they are extracted from the molds that have been used to form the articles.

What the inventions of the Parent Cases recognize is that, in the molding of a hollow glass article, the only cooling of a newly molded glass article that is necessary in order to permit the immediate discharge of the article from its mold is an amount of cooling that is adequate to give the glass enough strength to hold its shape. The inventions of the referenced Parent Cases address this very minimal need for cooling in a special way, namely by employing a very fast acting cooling technique that results in creating what essentially amounts to a solidified "skin" on the interior surface of a newly formed hollow glass article. Once this interior "skin" has been formed and has cooled sufficiently to act as a stable mainstay that will render the newly molded article shape-stable, the mold can be opened and the newly molded article can be removed.

The fast formation of an adequately cooled and rigidified interior "skin" permits a newly molded glass article to be extracted far more quickly from its mold than previously has been possible with prior glass molding cooling techniques. Because the mold can be recycled and reused more quickly than has previously been thought to be possible, and a very significant increase in productivity of molded articles is achieved while utilizing existing production facilities.

SUMMARY OF THE INVENTION

The present invention represents the work product of a longstanding and continuing program of development that initially gave rise to the inventions of the referenced Parent Cases.

The system of the present invention relates to the press molding of hollow glass articles by utilizing cooling gases that are mixtures of cryogen from a high pressure cryogen source, and air from a source of pressurized air. In order to assure optimum cryogen injection, a tube for injecting the "high pressure" (i.e., high velocity) cryogen flow is coaxially housed within and protectively shrouded by a larger tube that supplies a gentle, substantially continuous flow of "low pressure" (i.e., low velocity) cryogen gas.

The system of the present invention, like those of the referenced Parent Cases, takes advantage of the discovery that, once an interior surface skin has been formed in a newly molded glass article (as by the introduction into the hollow article of a relatively cold cooling gas), this interior skin may be utilized to provide shape stability for the newly formed article. Thus, newly molded articles of glass may be removed quite quickly from their molds, and the molds may be recycled and reused while the articles are completing their solidification.

In preferred practice, a flow of cryogen from a high pressure source is introduced into the hollow interior of a newly molded glass article, e.g., a beer mug, along with a flow of air from a high pressure source. Separate inlet tubes serves as "injectors" for concurrently supplying cryogen and air to cool newly molded articles. The separate injectors for cryogen and air preferably are oriented and configured to effect mixing of the cold cryogen with air at a location inside the hollow interiors of newly molded articles, with the injection of these cooling media being effected at a cooling station which is located as close as possible to the molding station where articles are press molded.

Preferably the high pressure cryogen inlet tube is placed within a larger diameter tube that delivers a continuous low pressure flow of cryogen gas to prevent moisture laden ambient air from entering the inner high pressure cryogen injector tube when the flow through the high pressure injector tube it is turned off.

As a result of the practice of the present invention, cooling gases that are considerably reduced in temperature as compared with ambient air hasten the cooling and solidification of newly formed glass articles so that the time during which newly molded articles must be retained in their molds is significantly reduced, and the mold can be reused to more quickly repeat the molding process, thereby increasing productivity at a relatively low cost.

BRIEF DESCRIPTION OF THE DRAWING

Other features and a fuller understanding of the invention may be had by referring to the following descriptions and claims, taken in conjunction with the accompanying drawing, wherein:

FIG. 1 is a schematic side elevational view illustrating the first of four sequential steps in the press-forming and cooling of a hollow glass article, with the view showing the introduction of a gob of molten glass into a mold;

FIG. 2 is a schematic side elevational view of the second step, with the view showing the gob of molten glass in the bottom of the mold;

FIG. 3 i a schematic side elevational view of the third step, with the view showing the press forming of a hollow glass article in the mold; and, FIG. 4 is a schematic side elevational view of the fourth step, with the view showing the introduction of cooling media into the hollow interior of a newly molded glass article:

DESCRIPTION OF THE PREFERRED EMBODIMENT

Referring to FIGS. 1 through 4, four work stations of a glass molding apparatus are depicted schematically and indicated generally by the numerals 10, 20, 30, 40. The work stations 10, 20, 30, 40 are utilized herein to depict a conventional series of sequential steps that are carried out by automated glass molding machinery to press-form a heated plastic gob of molten glass 11 being introduced into a cavity 15 of mold 12 through an open upper end 13 as shown in FIG. 1 and deposited in the bottom 14 of mold 12, as is shown in FIG. 2.

In FIG. 3, a mold core 16 is shown pressed into the cavity 15 of mold 12 until the form of the gob 11 has been conformed to the shape of the mold cavity 15 whereby a press formed article 20 is formed. The mold core 16 is then withdrawn so that a hollow interior 21 of the article 20 can be injected with flows of cooling gases, as is depicted in FIG. 4.

Referring to FIG. 4, an injector 50 is depicted for supplying air from a source of pressurized air (not shown) so that, when a newly molded glass article 20 is moved in its mold to a cooling station 40 (that is located as closely as possible to the molding station 30 wherein the article 20 was press molded), a flow of air from the high pressure source of air can be begun and can be continued for a brief interval of time that is sufficient (when combined with a flow of cold cryogen from an adjacent cryogen injector 60) to cool the article 20 and form a skin of solidified glass on its inner surface portions, whereby shape stability is imparted to the article 20.

Because the form in which the cryogen can be injected into the mold from what has been referred to as the "high pressure injector 60" can be a liquid cryogen such as liquid nitrogen, can be a gaseous cryogen such as liquid nitrogen that has just been vaporized to form a fluid of principally gaseous form, or can be a mixture of liquid and gaseous cryogen such as liquid nitrogen that is in the process of evaporating, it will be understood by those skilled in the art that the temperature of the "high pressure injector 60" can be quite low indeed (perhaps nearly as low as the temperature of the liquid cryogen that is being injected), or can range as high as about 30 to 45 degrees Fahrenheit, depending on what in the way of a cryogen liquid, gas or vapor flow is being injected.

Moreover, due to the extraordinarily cold temperatures that are encountered if liquid cryogen is being injected through the "high pressure injector 60," it will be understood that, even when the injected cryogen is mixed with air, the resulting cooling gas will be far below the range of temperatures at which the molding process has been carried out using present day techniques. A very surprising result that has been found with the implementation and development of the present invention is that liquid cryogen actually can be injected into a newly formed press molded glass article, and that, by mixing the cryogen in the hollow interior of the article with a flow of air, typically ambient air, a cooling gas is provided that cools the article without doing damage either to the article or to the molding apparatus—with the cooling taking place on an extraordinarily expedited basis, whereby the thin interior skin of solidified glass that forms on inner surfaces of glass articles is formed in a very expedited basis, in some instances almost "instantaneously" to the eye of one who views the process.

An injector 60 for cryogen is of a tube-within-a-tube type of construction, with an inner tube 62 being connected to a source (not shown) of high pressure cryogen, and with an outer, coaxially arranged shrouding tube 64 for connection to a relatively low pressure source (not shown) of cryogen gas.

The flow of cryogen that emerges from the inner injector tube 62 is of relatively high velocity, and is operated (together with the relatively high velocity flow of air that issues from the injector tube 50) when a mold containing a newly formed article 20 is positioned beneath the injector tubes 50, 62, 64. This is in contradistinction to the relatively low velocity of the flow of cryogen gas that is maintained without interruption through the outer tube 64, with this low velocity flow serving not only to enhance the normal wind-like flow of cooling air that is provided about glass molding machinery, but also serving to keep the discharge end region of the inner tube 62 purged of ambient air so that, when the flow of high velocity cryogen is stopped from discharging through the injector tube 62, moisture laden ambient air does not enter or otherwise come into contact with the very cold inner injector tube 62; hence, possible problems of condensation of moisture and formation of ice deposits on, about or in the inner tube 62 are obviated.

The flows of air and cryogen from the injector tubes 50, 62 are directed into the hollow inner region of the newly formed article 20 so as to mix within the hollow inner region and to thereby provide a cold cooling medium (of gaseous form once the cryogen has been mixed with air at a location inside the hollow inner region of a newly formed article). A unexpected finding that has come to light as this invention has been developed is that the temperature of the resulting cooling gas can range widely from considerably below zero on the Fahrenheit scale to about 30 to 45 degrees or higher, and, depending on the extent of the cooling that is provided by providing this gas at progressively lower temperatures, solidification of newly formed articles can be hastened without detrimentally affecting the articles. It is unexpected, indeed, to find that such rapid shock-like cooling will not hurt the newly formed articles while it functions successfully to effectively hasten the formation of an inner "skin" of solidified glass that will give the article shape stability—and that will enable the article 20 to be removed as quickly as possible from the mold in which the article was formed.

The cost of a cryogen such as nitrogen which is added to high pressure air to form a suitable cooling gas is quite minimal in comparison with the very substantial increases in production of press molded articles that can be achieved. The temperature and duration of the nitrogen mixed with a cold cryogen cooling flow can be adjusted to optimize cryogen usage for a selected rate of article production.

The system of the present invention (like the systems of the referenced Parent Cases), contravenes what has long been taken for granted by those skilled in the art of molding glass articles, namely that gases which are used to effect blow molding and/or cooling of molded glass articles must not be of significantly reduced temperature if they are to perform their functions without detrimentally affecting the quality of the glass articles being molded. As those skilled in the art of glass molding are quite aware, automated machinery for molding glass containers such as bottles and the like has been in use since the early 1900's; however, to the best knowledge of the inventors hereof, during more than 8 decades of use of such automated machinery (i.e., until the development of the systems of the Parent Cases), no installation has been made wherein pressurized cold cryogen vapor has been either mixed with or substituted for blow-molding gases and/or cooling gases to provide such gases to the mold cavities of an automated molding machine.

When the basic concept of the inventions of the referenced Parent Cases was first related to a number of persons who are acknowledged "experts" in the art of manufacturing glass containers and the like, the reception they gave this concept was one of "it can't possibly work." Stated in another way, what the inventions of the Parent Cases (and the improved system of the present application) proposes so "flies in the face" of conventional glass molding wisdom as to be "unthinkable." However, in tests of these systems, it has been found that increases in productivity of existing automated glass-molding machinery of at least 15 percent and often more are easily attainable, and at impressively low costs.

Although the invention has been described in its preferred form with a certain degree of particularity, it will be understood that the present disclosure of the preferred form has been made only by way of example, and that numerous changes in the details of construction and the combination and arrangements of parts and the like may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. In a method of making a hollow glass article by shaping a quantity of molten glass in a mold cavity, the improvement comprising the steps of:
    (a) placing a gob of molten glass in a mold cavity that defines features of the shape of the article that is to be formed;
    (b) pressure forming a glass article by pressing a mold core within the mold cavity against the molten glass gob and pressure forcing the molten glass to flow in a space between the mold core and mold cavity into a desired shape;
    (c) removing the mold core from a hollow of the newly formed glass article;
    (d) providing a source of pressurized cryogen which has a temperature substantially below that of ambient air;
    (e) providing a source of pressurized air; and,
    (f) introducing cryogen and air from the pressurized sources thereof through injector means for introducing flows of these flows into the hollow interior of the newly formed glass article to cool the newly formed glass article and to give the article shape stability so the newly formed glass article can be removed from the mold cavity.

2. The method of claim 1 wherein the cryogen and the flow of air are introduced as separate flows into the hollow interior by the injector means, and the step of introducing the cryogen and air includes the step of mixing the separate flows in the hollow interior of the newly formed glass article.

3. The method of claim 2 wherein the cryogen and the air are introduced simultaneously for a pulse time period of sufficient duration to directly cool interior surface portions of the molten glass therein and hasten its solidification, and wherein the cryogen that is introduced is a cryogen vapor.

4. The method of claim 3 wherein the cryogen vapor is nitrogen, and the pulse time period of introducing a flow cooling gas is of the same duration of time as is used for a pulse time period for introducing the flow of air.

5. The method of claim 1 wherein the cryogen is nitrogen.

6. The method of claim 1 wherein the step of introducing the flow of cryogen is effected by providing a gentle, substantially continuous flow of cryogen gas through an outer injector tube that encircles an inner injector tube that is arranged substantially coaxially within the outer tube and that is used to provide the flow of cryogen that is injected into the hollow interior of a newly formed glass article, with the gentle, substantially continuous flow serving to prevent moisture laden ambient air from entering the inner injector tube used for injecting cryogen into to the hollow interior of the newly formed article.

7. In a method of making a glass article having a hollow interior by press form shaping of a quantity of molten glass in a mold cavity, the improvement comprising the steps of providing a flow of pressurized cryogen which has a temperature that is substantially below that of ambient air, and introducing the flow of cryogen into a hollow interior portion of the newly press formed glass article to cool the interior of the newly formed glass article and hasten solidification thereof by forming a "skin" of solidified glass on interior surface portions thereof to give the article shape stability to enable the article to be removed quickly after molding from the mold in which the article was press formed.

8. The method of claim 7 wherein the step of providing a flow of cooling gas includes the steps of providing a flow of cold cryogen vapor which has a temperature that is substantially below that of ambient air, providing inlet means for ducting the flow of cold cryogen vapor into the hollow interior of a newly press formed glass article, and operating the inlet means to duct a controlled flow of cold cryogen vapor into hollow interior of a newly formed article to cool the molten glass that comprises the article and to hasten its solidification.

9. The method of claim 8 wherein the flow of cold cryogen vapor is mixed in the hollow interior of a newly formed article with a flow of air to provide a cooling gas that is substantially lower in temperature than the temperature of ambient air.

10. The method of claim 9 wherein the introduction of flows of cold cryogen vapor and air is effected using separate inlets, one for the cryogen vapor, and another for air, with the inlets being arranged to discharge into the hollow interior of a newly formed article so that mixing of the flows discharging from the inlets will be facilitated.

11. The method of claim 10 wherein the one inlet used for introduction of cryogen includes a tube-within-a-tube injector for the introduction of cryogen, with an inner tube and an outer tube extending substantially coaxially to form the tube-within-a-tube injector, with the outer tube being used to provide a gentle, substantially continuous flow of cryogen gas, and with the inner tube being used to provide the injected flow of cryogen gas into the interior of the article.

12. The method of claim 11 wherein the tube-within-a-tube inlet is positioned along a path of travel followed by newly formed press molded articles that exit from a molding station in the molds in which the articles were formed, with the positioning of the inlet being located in close proximity to the molding station and being aimed to discharge into the hollow interior of newly formed articles as they move from the molding station along the path of travel.

13. The method of claim 12 wherein the tube-within-a-tube inlet is located in fixed relation to a path of travel such that the inlet does not move with respect to the path of travel.

14. The method of claim 10 wherein the one and another separate inlets for the introduction of cryogen and air are arranged in close side-by-side for effecting a combination of the flows of air and cryogen that mix within the hollow interior of a newly formed article of glass.

15. In a hollow glass article manufacturing machine including a mold having a cavity into which a quantity of molten glass is introduced to be conformed to a desired shape as defined by the mold cavity, and having gas inlet means for admitting a flow of cooling gas to the mold cavity interiorally with respect to the hollow glass article being formed in the cavity to directly cool interior surface portions of the molten glass therein for at least assisting in conforming a quantity of molten glass to a desired configuration defined by the mold cavity, the improvement of means for providing separate flows of cold cryogen vapor and air into the hollow glass article wherein the flows are mixed to provide a cooling gas that has a temperature that is substantially below the temperature of ambient air, and wherein the gas inlet means includes:

(a) tube-within-a-tube cryogen injector means for separately discharging relatively low and relatively high velocity flows of cryogen vapor in directions generally toward the hollow interior of a newly formed pressed glass article;

(b) auxiliary injector means for discharging a flow of ambient air in a direction toward the hollow interior of a newly formed pressed glass article; and, (c) the cryogen and air injector means being arranged to direct flows of cryogen vapor and air into the hollow interior of a newly formed pressed glass article for mixing in the hollow interior to provide said cooling gas.

* * * * *

UNITED STATES PATENT AND TRADEMARK OFFICE
CERTIFICATE OF CORRECTION

PATENT NO. : 4,840,656

DATED : June 20, 1989

INVENTOR(S) : Michael J. Ziegler, Barry Millward, Kenneth P. Robb, Jr.

It is certified that error appears in the above-identified patent and that said Letters Patent is hereby corrected as shown below:

On the title page, item [57],

Line 27 after "reduced",

Insert -- , and productivity is significantly increased, all at relatively low expense -- .

Signed and Sealed this

Twentieth Day of March, 1990

Attest:

JEFFREY M. SAMUELS

Attesting Officer

Acting Commissioner of Patents and Trademarks